May 30, 1961 G. A. BURKLUND 2,986,698
FREQUENCY ANALYZERS
Filed Nov. 1, 1957 3 Sheets-Sheet 1

INVENTOR
GLENN A. BURKLUND

BY Alexander & Dowell
ATTORNEY

May 30, 1961 G. A. BURKLUND 2,986,698
FREQUENCY ANALYZERS
Filed Nov. 1, 1957 3 Sheets-Sheet 2
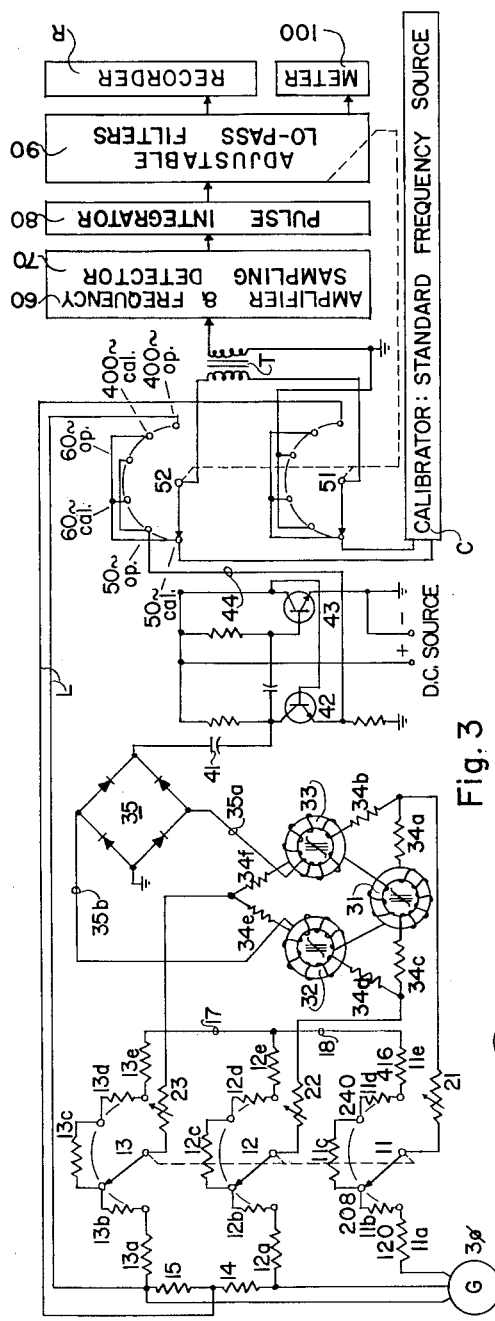
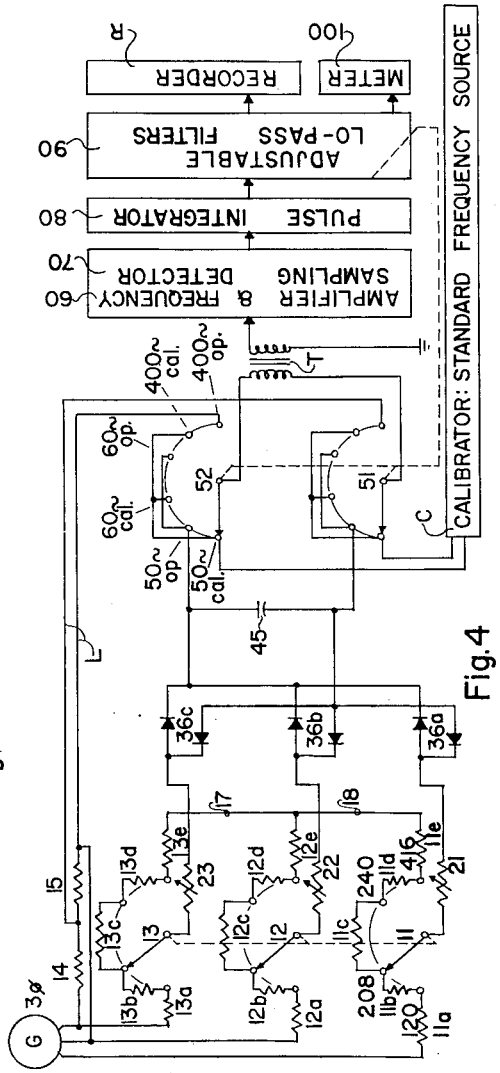
INVENTOR
GLENN A. BURKLUND
BY *Alexander & Dowell*
ATTORNEY United States Patent Office 2,986,698
Patented May 30, 1961

2,986,698
FREQUENCY ANALYZERS
Glenn A. Burklund, Fairfax, Va., assignor to American Machine & Foundry Company, a corporation of New Jersey
Filed Nov. 1, 1957, Ser. No. 694,027
20 Claims. (Cl. 324—78)

This invention relates to electrical wave analyzers, and more particularly to very sensitive analyzers for detecting and indicating both the frequency of a wave and any rapid changes in the frequency thereof, especially where the changes in frequency occur in steps transpiring within the duration of a portion of one cycle, the changes in frequency occurring as transients.

It is the principal object of the present invention to provide an analyzer having fast response and being capable of analyzing instantaneous deviations from identical wave-form spacings in succeeding cycles. The frequency is measured at a plurality of time intervals during the period of each cycle to detect transient accelerations and decelerations of the generated frequency.

It is a very important object of the invention to provide a frequency analyzer which is to a large extent insensitive to voltage variations which might otherwise be erroneously interpreted as frequency variations.

Another important object of this invention is to provide an analyzer which detects frequency changes by sampling the positions of the leading edges of recurrent cycles and which applies such sampling methods to multi-phase wave forms.

Still another very important object of the invention is to provide, for use with a multi-phase system, a frequency analyzer wherein the total number of samples of frequency taken in each fundamental period of a phase is increased by frequency multiplication before sampling, at least by a factor equal to twice the number of phases, i.e., six times in a 3-phase circuit.

It is another important object of the invention to provide an analyzer delivering a uni-directional output voltage representative of the degree and the direction of frequency variations of the wave being analyzed, and in which output voltage the presence of A.C. ripple from such waves is substantially suppressed.

Another object of the invention is to provide a multi-range analyzer capable of satisfactorily analyzing wave forms having one of several different nominal frequencies and/or having one of several different nominal voltages, the frequency measuring being accomplished by a detector comprising an integrating volt-second limiter as distinguished from a resonance-type device.

A further object is to provide an analyzer having a frequency indicating means including an expanded scale meter, whereby even small frequency changes provide a relatively large and easily interpreted indication.

It is another object to provide an analyzer capable of displaying a graphical representation of frequency variations on a time axis, the analyzer employing a recording instrument such as a string-galvanometer oscillograph.

Other objects and advantages of the present invention will become apparent during the detailed discussion of the drawings wherein:

Fig. 3 is a partial schematic diagram corresponding with the block diagram shown in Fig. 2 but illustrating a specific circuit which may be used in lieu of the first five blocks of the block diagram in Fig. 2.

Fig. 4 is a partial schematic diagram similar to Fig. 3 but showing a modified form of circuit corresponding with the first five blocks of the block diagram in Fig. 2.

Figure 1:
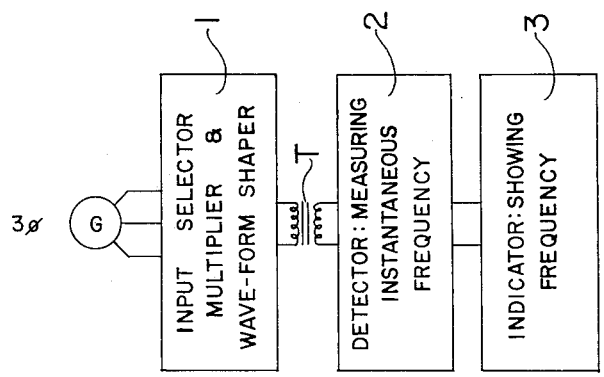
Figure 1 is a simplified block diagram showing a basic combination of units according to the present invention.

The embodiments shown in the drawings illustrate analyzers connected to receive current from a 3-phase generator G. As will be seen in the following description, in order to increase the versatility of this analyzer, it is equipped with switching means intended to make the device applicable to generated frequencies of 50, 60 and 400 cycles. In addition the analyzer is provided with further switching means intended to adapt the device for use in analyzing waves generated at one of a plurality of different nominal voltages, in the present illustration the voltages including 120, 208, 240 and 416 volts.

Figure 2:
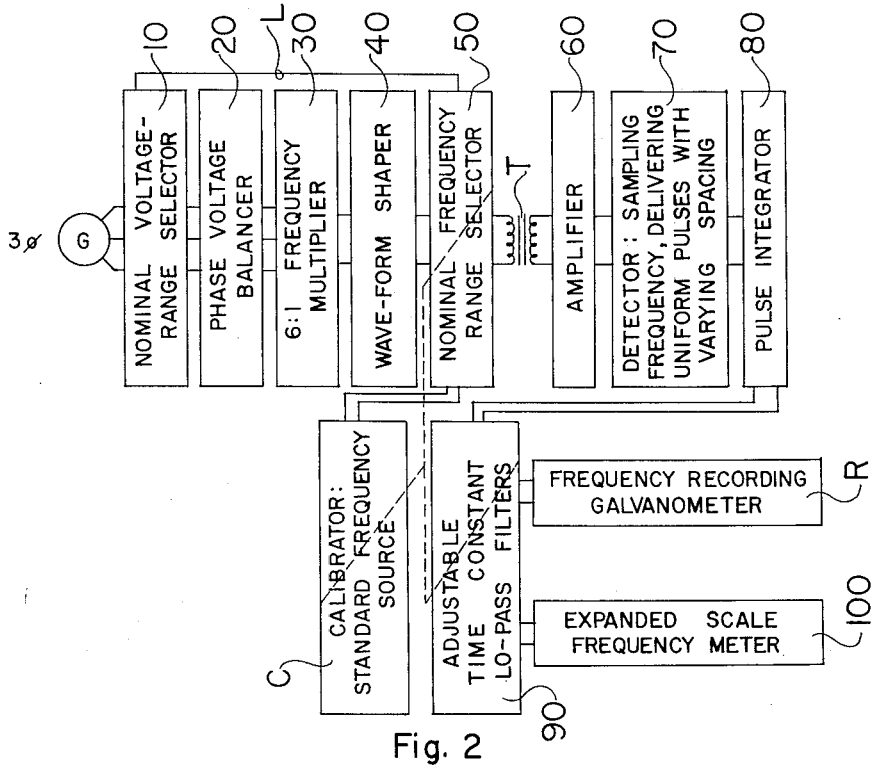
Fig. 2 is a more detailed block diagram showing a combination of units providing a more practical analyzer.

Some of the differences between the block diagrams shown in Figs. 1 and 2 reside in the fact that the diagram in Fig. 2 includes means for adapting a basic analyzer as shown in Fig. 1 to the analyzing of a plurality of different nominal voltages and frequencies as set forth above.

Basically, the analyzer comprises an input selector, multiplier and wave form shaper 1 which supplies a train of output waves in which the major variations are restricted to variations of frequency as distinguished from amplitude. This output train is then fed to a frequency detector 2 which measures the instantaneous frequency and delivers a succession of output charges which may be filtered to provide a voltage, the amplitude of which is proportional to the instantaneous frequency at the input. This output voltage from the frequency detector 2 is then displayed on an indicator unit 3 which may comprise a meter calibrated in terms of frequency, or a recording galvanometer which provides a graphical presentation of frequency variations on a time axis.

The block diagram of Fig. 2 is considerably more detailed than that of Fig. 1 and shows additional functions performed by the various sub-units. The output of the 3-phase generator G may be at 50, 60, or 400 cycles, and, in addition, may be at 120, 208, 240, or 416 volts. In order to make the analyzer readily adaptable for operation with any one of the above outputs of the generator, or with other conceivable outputs, a nominal voltage range selector 10 (Fig. 2) is provided, which selector receives the output of the generator G at any one of the above-mentioned voltages and reduces the nominal output voltage to a pre-standardized value of voltage which is substantially constant regardless of which one of the nominal voltage ranges is selected. When the voltage range has been selected and the voltage reduced to such a standardized value by the unit 10, the output thereof is then delivered to the phase voltage balancer 20 which serves the purpose of correcting the relative amplitudes of the 3-phases so as to make them all uniform. Thus, the output voltages of the unit 20 should be for any selected nominal input substantially uniform in each of the three phases.

After the units 10 and 20 have substantially standardized the generator voltage for a particular nominal voltage and as between the phases, it then becomes desirable to standardize the nominal frequency of the generator output to a certain extent. In the analyzer illustrated in the drawings the nominal input frequencies include 50, 60, and 400 cycles, and thus it is apparent that there is a considerable range of input frequencies over which the analyzer must function, especially as between the 50–60 cycle range and the 400 cycle range. In order to render these frequency ranges more nearly the same, it is desirable to employ frequency multiplication of the lower ranges. For example, if a 6:1 frequency multiplier is employed to multiply the 50–60 cycle inputs, the corresponding outputs of these multipliers would be respectively 300 and 360 cycles per second, the range of which frequencies is not very different from the 400 cycle input frequency. Thus, the present invention provides a 6:1 frequency multiplier arranged such that it will be operative whenever the analyzer is being used on the 50 cycle or the 60 cycle range, but so that it will be rendered inoperative whenever the analyzer is used on the 400 cycle range.

A line L is shown connected between the nominal voltage range selector 10 and the nominal frequency range selector 50, the line L furnishing 400 cycle input to the nominal frequency range selector 50 when this selector is adjusted to the 400 cycle range. When the nominal frequency range selector 50 is adjusted to the 50 cycle or 60 cycle range, however, it receives the multiplied output of the multiplier 30, which output is passed through an interposed wave-form shaper 40. The purpose of the wave-form shaper 40 is to restore to the frequency multiplied output of the multiplier 30 a reasonable semblance of a sinusoidal wave form. In other words, in view of the fact that the nominal frequency range selector 50 receives a sine wave through the line L when adjusted to the 400 cycle range, it is desirable that when the analyzer is adjusted to the 50 or the 60 cycle nominal range that the input thereto from the frequency multiplier 30 also be at least approximately sinusoidal.

The output of the nominal frequency range selector 50 is illustrated as coupled to an amplifier 60 which provides the input to the frequency detector 70, this coupling being accomplished in each of the five figures by a transformer T. The transformer T has been illustrated as a separate component in each of the diagrams in order to indicate corresponding circuit locations in each of the figures of the drawings, the transformer T serving as a division between the input voltage and frequency selecting circuits and the multiplier on the one hand, and the frequency detector circuits on the other hand.

The output of the transformer T, within each of the ranges of the analyzer, will be a voltage having a substantially constant amplitude and a wave form at least approximating a sine wave. The frequency of this voltage will be either 300, 360 or 400 cycles. This output voltage from the transformer T is then fed into the frequency detector and associated circuits which may include an amplifier 60, the output of which is fed into a frequency detector and sampling circuit 70 which delivers pulses each of uniform total energy, but having spacings between pulses which vary in accordance with the instantaneous frequency generated. This frequency detector and sampling circuit 70 delivers the said uniform-energy pulses to an integrator 80 and then to a low-pass filter 90 which provides a smoothed unidirectional output voltage which is as free as possible of ripple, the instantaneous value of said output varying in accordance with the instantaneous variations in the frequency of the generator G. The filtered output voltage then is displayed either instantaneously as a reading on a meter 100 calibrated in terms of frequency, or else graphically as a recorded trace from a recording galvanometer in which frequency is continuously plotted against time.

In the embodiments illustrated in Figs. 2, 3, 4 and 5 an external calibrator C is provided which comprises a frequency standard which can be selectively switched into the nominal frequency range selector 50 for the purpose of calibrating the frequency measuring and indicating circuits against standard calibration frequencies.

The input selector, multiplier and wave shaping units will be described in terms of the two different embodiments shown in Figs. 3 and 4, respectively, the modifications appearing in the specific circuits corresponding with blocks 10, 20, 30, 40 and 50, shown in Fig. 2.

Turning now to a description of the first of these modifications, as shown in Fig. 3, a 3-phase generator G provides an input to the nominal voltage range selector 10 which selector includes the ganged switches 11, 12 and 13. Adjacent the contacts of the switch 11 are noted the nominal voltage ranges 120, 208, 240 and 416, and it will be further noted that in the case of each of the three switches, 11, 12 and 13, a series of voltage-divider resistors bearing the designations a, b, c, d and e are illustrated, the first of each of these resistors being connected to one of the three generator phases. In addition, two other resistors 14 and 15 are provided across two of the phases to act as a voltage divider for use in supplying a 400 cycle signal when the unit is used on this range, as hereinafter discussed.

The three series of voltage-divider resistors 11a through 11e, 12a through 12e, and 13a through 13e, are mutually Y-connected by the wires 17 and 18, and the rotors of switches 11, 12 and 13 are each respectively connected to a variable resistor, 21, 22 or 23, which combine to serve as the phase voltage balancer 20, and the other ends of these latter resistors comprise the outputs of the phase voltage balancer 20.

These outputs lead to the 6:1 frequency multiplier 30 which in Fig. 3 comprises a delta-connected saturable reactor circuit including three saturable transformers 31, 32 and 33. The primary windings of these saturable reactors are connected in delta and connected to the outputs of the phase voltage balancing resistors 21, 22 and 23 through isolation resistors 34a, b, c, d, e and f, these resistors serving the purpose of isolating the primary windings of the saturable transformers 31, 32 and 33 from each other. The secondary windings of the saturable transformers 31, 32 and 33 are all connected in series so that the outputs thereof will be summed and passed through a full wave rectifier 35 which serves to erect all of the output waves from the saturable reactor circuit and orient them to the same polarity. The outputs of the saturable transformers 31, 32 and 33 passing through the two output leads 35a and 35b which go to the full-wave rectifier 35 comprise alternate positive and negative pulses of short duration, and each of these pulses exactly coincides in time with the leading edge of the input wave form to each of the transformers through the respective resistors 34. In other words, these transformers saturate near the leading edge of the sinusoidal wave forms which are passing through the primaries thereof and thereby provide pulses in the secondary windings which are similar in shape to the leading edges and early portion of the input sine waves. The output of the full wave rectifier is similar to the input except that the negative pulses are erected and oriented in a positive direction so as to provide six positive pulses for each phase cycle of the generator shaft. The 6:1 multiplied output in the form of erected pulses is connected by a condenser 41 to a wave form shaper 40 which comprises a transistor multivibrator including the transistors 42 and 43 connected to provide a mono-stable multi-vibrator, the details of such circuit being well known. Each pulse passing through the condenser 41 to the multivibrator 42—43 triggers the multivibrator and causes it to cycle once from the stable state to the non-stable state, and back again. This cycling of the multivibrator 42—43 causes the pulses from the multiplier 30 to be converted into wave forms which are substantially uniform regardless of reasonable amplitude variations of the input pulses from the condenser 41. This feature is of great importance since it renders the output of the wave-form shaper 40, substantially independent of voltage variations passing through the preceding circuits. The output of this wave form shaper is connected by the wire 44, and ground, into the input to the nominal frequency range selector 50 which includes the ganged switches 51 and 52, The various operating positions of these switches are indicated at the switches 52 and include, reading clockwise the following positions:

50 cycle calibrate, 50 cycle operate,
60 cycle calibrate, 60 cycle operate,
400 cycle calibrate and 400 cycle operate.

In each of the three "calibrate" positions the switches are connected with a calibrator C which comprises an external standard frequency source injecting standard test signals into the switches 51—52 at one of several precisely determined frequencies. The details of the calibrator C will not be discussed since these details form no part of the present invention.

In the "50-cycle operate" and also in the "60-cycle operate" positions, the output of the wave form shaper 40 to the switches is connected thereby in turn to the primary of the transformer T. In the "400-cycle operate" position, however, the wave required to energize the transformer T is taken directly from the voltage divider resistors 14—15 disposed across two of the phases of the 3-phase generator G, said wave not passing through the multiplier 30. The lines connecting the input to the "400-cycle operate" position are marked L to correspond with a similar marking on Fig. 2.

The secondary of the transformer T is connected into an amplifier, and thence to a frequency detector and measuring circuit in the manner described in connection with Fig. 2. The circuit and its performance from this point on will not be discussed here since a detailed discussion thereof appears hereinafter in connection with Fig. 5 of the drawing.

Fig. 4 constitutes a modified form of that portion of the analyzer which precedes the primary of the transformer T. In this figure, parts which correspond identically with those shown in Fig. 3 are given the same reference characters. Particularly, in connection with the nominal voltage range selector 10, the phase voltage balancer 20, and the nominal frequency range selector 50, the circuits are substantially identical. The principal difference between the circuits shown in Fig. 3 and Fig. 4 lies in the details of the 6:1 frequency multiplier and of the wave form shaper. In Fig. 4, the 6:1 frequency multiplier comprises 3-phase full-wave rectifiers 36a, 36b, and 36c, which are connected to receive a 3-phase voltage from the phase voltage balancing resistors 21, 22 and 23 and to provide a composite output comprising half-wave ripple at six times the fundamental frequency, wherein all of the rectified half-wave cycles of the three phases are superimposed in sequential relation, there being also a considerable direct current component. If the D.C. component is eliminated, there remains a strong frequency-multiplied wave-form which, however, is not sinusoidal. In order to render the wave form more nearly sinusoidal, the condenser 45 is, through the switches 51—52, applied across the primary of the transformer T for the purpose of tuning the transformer winding to provide a resonance effect and cause the wave form across the condenser 45 and the transformer T to approach more nearly a sinusoidal shape. The combination of the condenser 45 and the transformer T constitutes the wave form shaper for the multiplied frequency in the modification of Fig. 4. As in the case of Fig. 3, the nominal frequency range selector switches 51—52 selectively connect the transformer T across the calibrator C or across the output of the 6:1 frequency multiplier. The secondary of the transformer T connects into the frequency detection and sampling circuits which will now be discussed in connection with Fig. 5.

Figure 5:
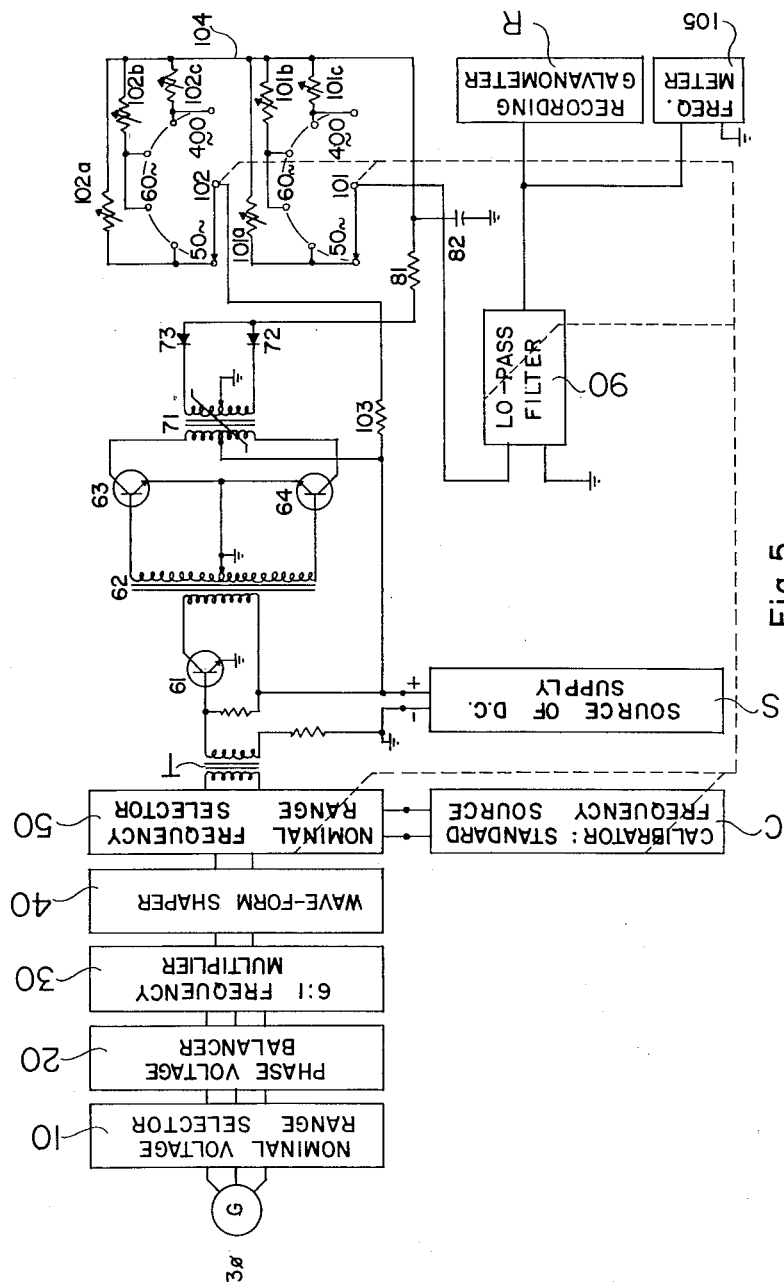
Fig. 5 is a partial schematic diagram similar to the block diagram shown in Fig. 2 except that practical circuits have been shown schematically in place of some of the blocks following the first five blocks illustrated in Fig. 2.

Again, using the transformer T as a dividing point in the analyzer, the circuits located to the right of the transformer are shown in greater detail in Fig. 5, wherein the previously discussed circuits to the left of the transformer are included merely in block diagram form.

In Fig. 5, referring specifically to the circuits shown to the right of the transformer T, these circuits include first and second transistor amplifier stages. The input transistor 61 is transformer-coupled to the push-pull stages 63—64 by the transformer 62, and the output of the push-pull stage is coupled by a transformer 71 to a pair of diodes 72—73 acting as full-wave rectifiers. The transformer 71 has a saturable core, and in conjunction with the full-wave rectifiers 72—73 comprises the detector which samples the frequency and delivers trains of pulses, each having uniform total energy as determined by the saturation characteristic of the transformer 71. However, the spacing between pulses varies according to instantaneous frequency variations of the output of the generator G. The output voltage of the push-pull amplifiers 63—64 approximates a sine wave having an amplitude which is more than adequate to saturate the core of the saturable transformer 71. Therefore, the output of the transformer 71 comprises a series of alternate positive and negative pulses having uniform cross sectional area as determined by the saturation characteristic of the core of the transformer 71. The full-wave rectifiers 72—73 are connected in such a way as to erect the alternate positive and negative pulses from the transformer 71 and provide an output to the resistance 81 which comprises only unidirectional pulses. The resistance 81, in combination with the capacitor 82 comprise the pulse integrator 80 which sums the uni-directional pulses delivered by the rectifying diodes 72—73, the output of the pulse integrator 81—82 comprising a smoothed voltage having an instantaneous amplitude dependent upon the instantaneous spacings of the pulses received from the diodes 72—73. The pulse integrator 81—82 is shown as a very simple circuit although it is to be understood that the circuit may be augmented so as to provide increased filtering of the integrated output.

The switches 101—102 are gang-connected to the nominal frequency range selector 50 and are arranged in such a way that the first two terminals of each of the switches are connected for "50-cycle calibration" or "operation"; that the second two terminals are connected for "60-cycle calibration" or "operation"; and that the final two terminals are connected for "400-cycle calibration" or "operation." The circuits of the switches 101—102 are actually connected in series, the wiper of the switch 102 being connected with the resistance 103 which is connected in series with a source of D.C. voltage. Depending on the position of the wiper of the switch 102, one of the three resistances 102a, 102b, or 102c will be connected in series with a lead 104 which in turn goes to the resistances 101a, 101b and 101c. Again depending on the position of the wipers, one of these resistances will in turn be connected in series with the wiper arm of the switch 101 which is then connected through the low-pass filter 90 into the frequency meter 105. The output of the pulse integrator 81—82 is connected to the junction between the resistances 101a—101b—101c, and the resistances 102a—102b—102c. The purpose of the switching of the resistances 102a, 102b and 102c is to provide a bucking voltage in the circuit of the meter 105 so as to provide an expanded scale reading for the meter wherein voltages below a certain level are bucked out, the meter reading only voltages which exceed said certain level as they arrive from the pulse integrator 81—82. This type of expanded scale meter is well known per se and will not be further discussed. The purpose of the variable resistance 101a, 101b and 101c is to provide an adjustment of the maximum or full-scale reading of the frequency meter 105 so that the meter may be calibrated in terms of input frequency when using the calibrator C.

Finally, the low-pass filter 90 is adjustable so as to provide a variable time-constant in the indicator circuit by which the sensitivity of frequency response of the analyzer may be controlled. The greater the filtering effect introduced by the low-pass filter 90, the more devoid the output of the frequency sampling circuit 70 will be of undesirable ripple voltage that would pass through the system and be introduced as a cyclic error voltage at the output. For instance, when the recording galvanometer R is employed, it will be desirable to introduce enough filtering to suppress the undesirable ripple, but at the same time to avoid introducing so much filtering that the output is over-damped and does not show the details of instantaneous variations in generator frequency. The filter 90 may be made adjustable either separately from or in conjunction with the selection of the nominal frequency range selector 50 and of the suppressed-zero expanded scale switches 101—102.

*Operation*

When in use, the present frequency analyzer will be connected to a source of voltage such as generator G, the frequency and nominal voltage of which will be known in advance. Assuming that the generated voltage is nominally 208 volts, the ganged switches 11—12—13 will be moved to the position shown in Figs. 3 and 4. At this position, the voltages appearing on the wipers of the three switches will be mutually 120 degrees apart in phase and will be reduced by the voltage divider resistors 11a, 11b, 11c, 11d and 11e and by the similar voltage divider resistors of switches 12 and 13, to a designated standardized voltage which is less than the minimum voltage for which the analyzer is designed, in this case less than 120 volts. Thence the reduced 3-phase voltages appearing at the wipers of switches 11, 12 and 13 will be conducted to inter-phase-voltage-balancing resistors 21, 22 and 23 which are adjustable so as to bring the three phase voltages to identical amplitudes although the voltages remain, of course, 120 degrees out of phase with respect to each other. The voltage balancing resistors 21, 22 and 23 also serve to permit compensation for circuit-constant differences between the paths of the various phases, i.e. differences in internal resistances of the diodes, etc. These balanced voltages are then conducted to the 6:1 frequency multiplier and shaper circuits 30 and 40, respectively.

In Fig. 3 the 6:1 frequency multiplier comprises the delta connected saturable transformers 31—32—33, the primaries of which are delta connected through isolation resistors 34a, 34b, 34c, 34d, 34e and 34f. The 3-phase currents passing through the saturable transformers 31, 32 and 33 are such as to cause early saturation of the cores thereof during the time that the current is increasing in the primaries, and therefore the output of the secondaries of the transformers 31, 32 and 33, which are connected in series, will comprise a plurality of pulses alternating in polarity and each arranged approximately 60 degrees in time from the preceding and succeeding pulses. The energy content of each of these pulses will remain substantially constant regardless of input voltage (within reasonable saturation limits) since the energy content is a function of the saturation characteristic of the cores. These pulses then pass through the full-wave rectifier 35 and are oriented all in the same direction.

From the full-wave rectifier the pulses pass through an isolation condenser to a mono-stable multivibrator circuit including transistors 42 and 43, and associated circuitry. The multivibrator transistors 42 and 43 are caused to oscillate through one cycle for each pulse introduced from the coupling condenser 41, and the output of the multivibrator will be a square wave recurring at six times the nominal frequency of the 3-phase generator G. This square-wave output will be connected across the primary of the transformer T through the switches 51 and 52 which serve the purpose of selectively connecting the square wave output from the line 44 to the transformer, or else connecting the output of the calibrator C across the transformer T in order to provide a standard frequency source by which the instrument may be calibrated before use.

As stated above, only the 50 and 60 cycle generator outputs will be multiplied by a factor of 6:1. The 400 cycle output is already within the selected 300 to 400 cycle operating range of the instrument and therefore need not be multiplied. Multiplication of said lower frequencies, in addition, serves the important purpose of providing a greater number of frequency sampling pulses per revolution of the generator shaft than would otherwise be possible in the absence of frequency multiplication. By this means, the instantaneous frequency of the generator is sampled every 60 degrees, for instance, in the case of a 60 cycle six-pole generator.

In the modification shown in Fig. 4, the frequency multiplier 30 takes the form of a somewhat simpler circuit employing a 3-phase full-wave rectifier 36a, 36b and 36c, and the wave-form shaper 40 takes the form of a condenser 45 connected in parallel with the primary of the transformer T to tune the latter to resonance in the vicinity of the range of frequencies to be passed thereby. In the circuit of Fig. 4, the rectifiers 36a, 36b and 36c merely orient all of the half cycles of all three phases in one direction in order to provide a direct current component topped by a ripple which occurs at a rate six times the nominal frequency of the generator G. By means of the tuning effect on the primary of the transformer T caused by the condenser 45, the wave form of this ripple is made to approximate that of a sine wave at the output of the transformer T so as to make the multiplied frequency have a wave shape similar to the wave shape of the 400 cycle voltage which is directly taken from one of the phases.

In the present embodiments, the 400 cycle range is not frequency-multiplied, and when the analyzer is being used to analyze the output of a 3-phase 400 cycle generator, only one phase thereof is employed to provide an input to the transformer T.

As shown in Fig. 5, the output of transformer T is first amplified in an amplifier 61, 62, 63, 64 and the push-pull output thereof is then fed into the frequency sampling circuit 71—72—73. The output amplitude of the push-pull portion of the amplifier 63—64 is much greater than the amplitude necessary to saturate the core of the transformer 71, and this core is therefore saturated near the leading edge of each half cycle. This saturation results in an output from the transformer 71 comprising alternate positive and negative pulses all of exactly uniform energy, these being then erected with respect to polarity by the rectifying diodes 72—73. Pulses emerge from these rectifiers as unidirectional narrow pulses which are then integrated in the integrator 81—82 the output of which is filtered by the adjustable time constant low-pass filter 90. The filtered output is then passed on to a frequency meter 105 having a suppressed-zero, the suppression being accomplished by means of resistances 102—103 which are connected to a source of D.C. voltage and connected in series with the meter so as to buck out voltages below a predetermined value passing from the integrator 81—82 to the meter. This meter is calibrated on its face in terms of frequency, and may be adjusted electrically to index its low end by means of one of the resistances 102a, 102b, or 102c. The meter may be further adjusted to index its high end by means of one of the resistances 101a, 101b, or 101c, depending on the nominal frequency range to which the switches 101—102 are connected. As stated above, the low-pass filter 90 is employed as a smoothing filter designed to suppress as much as possible the ripple voltage which appears in the output of the frequency sampling circuit. Therefore, adjustment is provided so that maximum sensitivity consistent with the amount of ripple-suppression necessary may be employed whenever reading frequency on the meter 105 or recording the output of the instrument as a graph on a time axis. The adjustment of the low-pass filter, therefore, is intended to permit selection of the best compromise between sensitivity of the analyzer and suppression of undesirable ripple frequency in its output.

The scope of this invention is not to be limited by the exact embodiments illustrated in the drawings, for changes therein may be made within the scope of the following claims.

I claim:

1. A transient analyzer for detecting and presenting indications of frequency variations appearing as deviations from identical successive electrical waves generated at an external source, comprising a frequency multiplier including rectifier means connected to said source and delivering rectified cycles comprising a ripple wave of higher frequency than the source waves and phase-locked thereto; waveshaping means connected with said multiplier for rendering the ripple wave more nearly symmetrical about its A.C. axis; a frequency detector connected to said multiplier to sample the spacings between the cycles of said higher frequency waves with respect to time and to deliver an electrical charge inversely proportional to said spacings; and an indicator connected to said frequency detector to receive said electrical charges, said indicator providing a display proportional to said charges and calibrated in terms of source frequency.

2. In an analyzer as set forth in claim 1, said waveshaping means comprising transformer means coupling the output of said rectifier means to said frequency detector and blocking the D.C. component of the rectifier output; and a capacitor across at least one winding of the transformer means and tuning the latter to resonance at the ripple frequency.

3. In an analyzer as set forth in claim 1, said frequency multiplier comprising a saturable-core transformer connected to receive said source waves and delivering pulses of alternating polarity, one pulse for each half cycle; and rectifier means connected to said transformer to receive said alternating-polarity pulses and erect the latter to the same polarity.

4. In an analyzer as set forth in claim 3, multivibrator means interposed between said rectifier means and said frequency detector, said multivibrator means being triggered by said pulses and delivering an output of uniform shape to said frequency detector.

5. In an analyzer as set forth in claim 1, said frequency detector comprising a saturable-core reactor having a primary winding connected to receive said frequency-multiplied train of waves, the amplitude of the said waves being greater than that required to saturate the reactor core, and said reactor having a secondary winding delivering pulses of alternating polarity and uniform energy content, one pulse being delivered at the beginning of each half-cycle of said frequency-multiplied train of waves; pulse erecting means for disposing the polarity of each pulse in the same direction; and leaky pulse-integrating means receiving pulses from said erecting means and delivering an output charge varying with time according to the rate at which said pulses are received.

6. In an analyzer as set forth in claim 1, said indicator comprising a recording galvanometer plotting a graph of the amplitude of said charges on a uniformly progressing time base.

7. In an analyzer as set forth in claim 6, a low-pass filter interposed between said galvanometer and said frequency detector, the time-constant of said filter being adjustable and determining the response rate of the analyzer to vary the detail shown on said graph.

8. In an analyzer as set forth in claim 1, said indicator comprising a direct reading meter indicating the present amplitude of said charge.

9. In an analyzer as set forth in claim 8, a source of potential reversed with respect to the polarity of said charges and connected between said detector and said indicator to provide suppressed-zero presentation on said meter of the useful range of said charges.

10. The combination of the analyzer set forth in claim 1 with a standard-frequency source; and switching means at the input to said frequency detector for effecting a selection of input to the detector between said multiplier and said standard-frequency source.

11. An analyzer as set forth in claim 1, for measuring the frequencies of waves from sources having nominal frequencies differing by at least 2:1 from each other, comprising a plurality of different paths from the source to the frequency detector, at least one of said paths going through said multiplier wherein the frequency of the lower-frequency waves is multiplied by a factor sufficient to increase the frequency of the output train of waves to within the same order of magnitude as the frequency of the higher-frequency waves, and at least one other of said paths going directly from said source to said frequency detector; and switching means to select one path according to the nominal frequency to be analyzed.

12. An analyzer for detecting and presenting indications of frequency variations in multi-phase electrical waves generated at an external source, comprising a frequency multiplier connected with said source to receive the multi-phase waves, and said multiplier delivering an output comprising the rectified half-cycles of the multi-phase waves superimposed to form a single train of waves having a frequency increased over the nominal generated frequency by a factor equal to twice the number of phases; a frequency detector connected to said multiplier to sample the spacings of each cycle of said train of waves and to deliver an electrical charge inversely proportional to each spacing sampled; and an indicator connected to said frequency detector to receive said electrical charges, said indicator providing a display proportional to said charges and calibrated in terms of source frequency.

13. In an analyzer as set forth in claim 12, said frequency multiplier comprising a plurality of full-wave rectifiers, each having its input connected to one of said multi-phases and the outputs of said rectifiers being all connected together to deliver said train of waves in the form of ripple, and wave shaping means for rendering the ripple more nearly symmetrical with its A.C. axis.

14. In an analyzer as set forth in claim 13, said wave shaping means comprising transformer means coupling the outputs of said rectifiers to said frequency detector and blocking the D.C. component of said outputs, and capacitor means connected across at least one winding of said transformer means and tuning the latter to resonance at the ripple frequency.

15. In an analyzer as set forth in claim 12, said frequency multiplier comprising one saturable-core transformer corresponding with each phase and each having a primary connected across a corresponding phase, and each transformer having a secondary, said secondaries being interconnected, the amplitude of the input to each primary being large in comparison with the input required to saturate the associated core, and the outputs of the interconnected secondaries comprising pulses of alternating polarity, one pulse for each half-cycle in a primary; and rectifier means connected to said secondaries to receive said alternating-polarity pulses and erect the latter to the same polarity.

16. In an analyzer as set forth in claim 14, multivibrator means interposed between said rectifier means and said frequency detector, said multivibrator means being triggered by said pulses and delivering an output of uniform shape to said frequency detector.

17. In an analyzer as set forth in claim 14, at least one isolation resistor in each primary connected between the primary and the phase to which it is connected.

18. In an analyzer as set forth in claim 12, said frequency detector comprising a saturable-core reactor having a primary winding connected to receive said frequency-multiplied train of waves, the amplitude of the said waves being greater than that required to saturate the reactor core, and said reactor having a secondary winding delivering pulses of alternating polarity and uniform energy content, one pulse being delivered at the beginning of each half-cycle of said frequency-multiplied train of waves; pulse erecting means for disposing the polarity of each pulse in the same direction; and leaky pulse integrating means receiving pulses from said erecting means and delivering an output charge varying with time according to the rate at which said pulses are received.

19. In an analyzer as set forth in claim 12, a resistance connected between said source and each associated frequency multiplier connection, said resistances being adjustable to balance the amplitudes of the phase components of the output of said multiplier.

20. In an analyzer as set forth in claim 19, each of said resistances including a tapped voltage divider across one phase; and ganged switching means controlling the selection of taps on all voltage dividers simultaneously to render the analyzer readily adaptable for use in analyzing the frequency of the waves from sources delivering different nominal voltages.

References Cited in the file of this patent

UNITED STATES PATENTS

| | | |
|---|---|---|
| 1,401,654 | Shepard | Dec. 27, 1921 |
| 2,324,077 | Goodale et al. | July 13, 1943 |
| 2,425,811 | Kent | Aug. 19, 1947 |
| 2,478,023 | Summerhayes | Aug. 2, 1949 |
| 2,510,531 | Trevor | June 6, 1950 |
| 2,629,008 | Lynch | Feb. 17, 1953 |
| 2,666,178 | Kramer | Jan. 12, 1954 |
| 2,756,376 | Davis et al. | July 24, 1956 |
| 2,845,579 | Logan | July 29, 1958 |